United States Patent
Robinson et al.

(10) Patent No.: US 8,159,680 B2
(45) Date of Patent: Apr. 17, 2012

(54) SINGLE-TRANSDUCER, THREE-DIMENSIONAL LASER IMAGING SYSTEM AND METHOD

(75) Inventors: Bryan S. Robinson, Arlington, MA (US); Don M. Boroson, Needham, MA (US); Marius A. Albota, Maynard, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 230 days.

(21) Appl. No.: 12/706,532

(22) Filed: Feb. 16, 2010

(65) Prior Publication Data

US 2011/0199621 A1    Aug. 18, 2011

(51) Int. Cl.
*G01B 11/24* (2006.01)

(52) U.S. Cl. ....................................... 356/601

(58) Field of Classification Search .................. 356/601, 356/628; 382/154
See application file for complete search history.

(56) References Cited

U.S. PATENT DOCUMENTS

| | | | |
|---|---|---|---|
| 3,918,025 A * | 11/1975 | Koshikawa et al. | 367/110 |
| 6,102,858 A | 8/2000 | Hatfield | |
| 2002/0016546 A1 | 2/2002 | Cerofolini | |
| 2009/0306510 A1 | 12/2009 | Hashiba | |

FOREIGN PATENT DOCUMENTS

KR    10-0255625    5/2000

OTHER PUBLICATIONS

Goda, et al., "Amplified Dispersive Fourier-Transform Imaging for Ultrafast Displacement Sensing and Barcode Reading," *Applied Physics Letters*, vol. 93, pp. 131109-1 through 31109-3 (published Oct. 2, 2008).
Goda, et al., "Serial Time-Encoded Amplified Imaging for Real-Time Observation of Fast Dynamic Phenomena," *Nature: Letters*, vol. 458, pp. 1145-1149 (Apr. 30, 2009).
International Search Report of PCT/US2011/024034.

* cited by examiner

*Primary Examiner* — Roy M Punnoose
(74) *Attorney, Agent, or Firm* — Foley & Lardner LLP

(57) ABSTRACT

Disclosed herein are a system and method for three-dimensional imaging using a single transducer. A laser in a transmitter emits a sequence of short pulses, each of which is at a different center wavelength (frequency). A dispersive element in the transmitter spatially separates the pulses according to wavelength, with different pulses mapped to different spatial locations in a target volume via a lens. The pulses travel to the target, which scatters or back-reflects the pulses towards the dispersive element via the lens. The lens collects the returned pulses and transmits them to a single transducer via the dispersive element. The transducer measures the time of arrival for each returned pulse. Because the arrival time depends on the range to the object in the portion of the target illuminated by the corresponding emitted pulse, the measured arrival time can be used to reconstruct a 3D (angle-angle-range) image of the object.

30 Claims, 5 Drawing Sheets

SINGLE-TRANSDUCER, THREE-DIMENSIONAL LASER IMAGING SYSTEM AND METHOD

GOVERNMENT SUPPORT

The invention was supported, in whole or in part, by a grant FA8721-05-C-0002 from the U.S. Air Force. The Government has certain rights in the invention.

BACKGROUND OF THE INVENTION

Three-dimensional (3D) imaging typically involves sweeping or scanning a beam across a volume and measuring the radiation reflected or scattered by an object in the volume. The angle or position of the beam corresponds to the object's transverse (x and y) coordinates, and the delay between the emission of the beam and the arrival of the reflected or scattered radiation, or time-of-flight, indicates the object's range, or location in z. The returned radiation is typically sensed with a detector array, such as an array of avalanche photodiodes, and used to create a 3D image of the scene being illuminated. In general, the range of the system depends on the sensitivity of the detector array, with better sensitivity giving better range performance for a given transmitter power and aperture size.

The range resolution is often limited by the precision of the time-of-flight measurement, which depends on the timing jitter of the transducer that detects the scattered or returned radiation. For example, the timing jitter of the avalanche photodiodes used in current near-infrared imaging laser radars is about $\delta t=350$ ps, limiting the range precision to about 5.3 cm. While range granularity of a few centimeters is good enough for imaging many objects, higher resolution and improved capabilities, such as face recognition, are often desired. Unfortunately, sensitive detectors with lower timing jitter cannot be easily arranged into arrays.

Thus, a need exists for a 3D imaging system that operates with low timing jitter and good sensitivity.

SUMMARY OF THE INVENTION

Embodiments of the present invention include three-dimensional (3D) imaging systems and corresponding methods of imaging that uses a single transducer to detect pulses at different center frequencies to different spatial locations. A source generates a series of pulses, each of which has a distinct center frequency. The pulses are coupled to a frequency-to-space converter, such as a grating, arrayed waveguide grating, or virtual image phased array, that maps each pulse to a different spatial location based on the center frequency of the pulse. An aperture receives pulses scattered or reflected from objects at the spatial locations and couples the received pulses to a transducer, which converts the received pulses into electrical signals that represent a 3D image corresponding to the spatial locations. Example imaging systems include only one high-speed transducer.

Because example systems require only one transducer, the transducer can be chosen to have as small a timing jitter as is practical, eliminating or lowering limits on range resolution. The use of a single photon-counting transducer also enables detection of scattered or reflected returns that are too weak to be detected with conventional detector arrays. In addition, mapping center frequency to spatial location does not require moving parts, such as galvo-scanning mirrors, or active beam-steering components, such as acousto-optic and electro-optic deflectors, unlike other beam steering techniques. These attributes give imagers that map pulses of different center frequencies to different spatial locations the ability to operate with better range resolution, detect weaker signals, and scan more quickly than other 3D imagers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
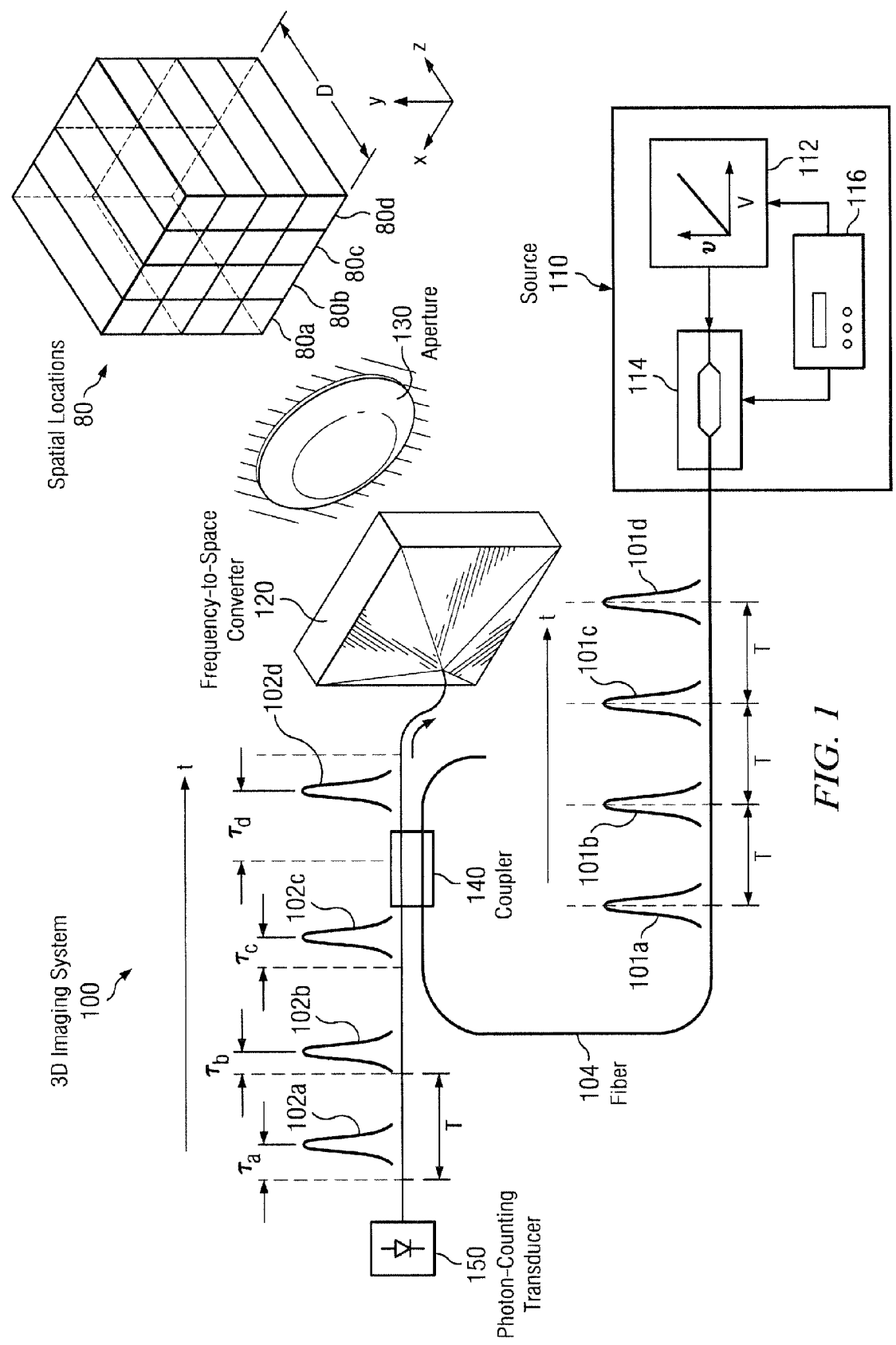
FIG. 1 is a schematic diagram of a monostatic three-dimensional (3D) imaging system according to embodiments of the present invention.

FIG. 1 shows a monostatic three-dimensional (3D) imaging system 100 that maps pulses 101a-101d (collectively, pulses 101) to corresponding spatial locations 80a-80d (collectively, spatial locations 80) based on the center frequencies of the pulses 101. For clarity, only the first row of spatial locations 80a-80d and the corresponding pulses 101a-101d are labeled in FIG. 1. The pulses 101 are emitted by a source 110 that includes a tunable laser 112 coupled to a pulse carver 114. A waveform generator 116 applies a voltage to the tunable laser 112, causing the output of the laser 112 to change in frequency. For example, the laser frequency may be "chirped," or swept from a low frequency to a high frequency (or vice versa) by applying an increasing voltage to the laser 112. At the same time, the waveform generator 114 applies a voltage to the pulse carver 114, which may include a fiber-coupled Mach-Zehnder modulator, causing the pulse carver 114 to transmit the laser output in a selective fashion. In other words, the pulse carver 114 "carves" out pieces of the laser's output to form a pulse train, or series of pulses 101, with each pulse at a center frequency equal to the instantaneous frequency of the laser output. Although the series of pulses 101 shown in FIG. 1 are separated from each other by a period T, other series of pulses may arranged aperiodically.

If the frequency of the laser output sweeps from low frequency to high frequency, then the first pulse in the series, pulse 101a, has the lowest center frequency, and the last pulse in the series has the highest center frequency. Sweeping the laser output from high frequency to low frequency inverts the relationship between pulse order and center frequency. As explained in greater detail below, the exact relationship between center frequency and pulse order determines the order in which the spatial locations 80 are imaged.

Figure 3:
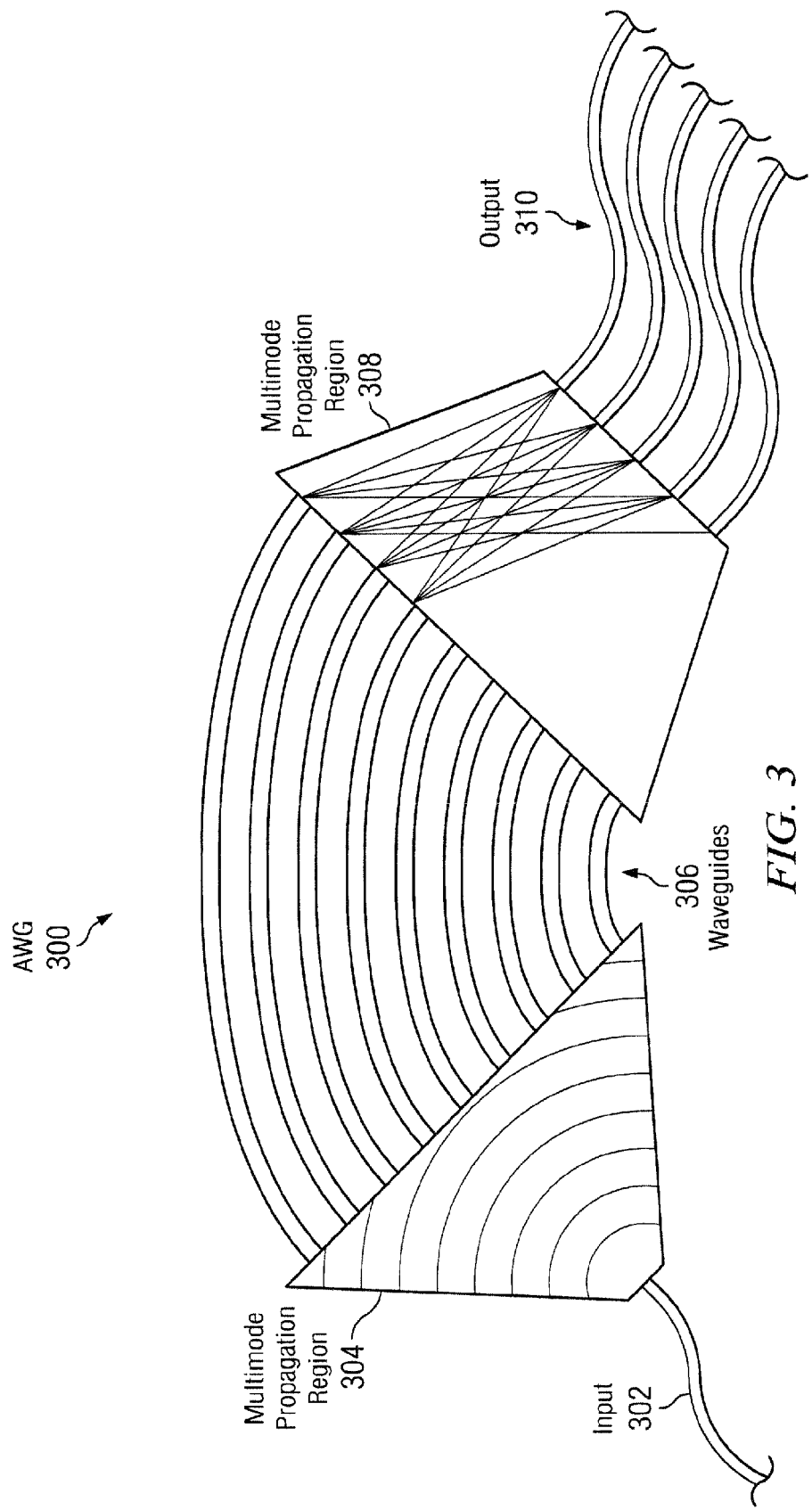
FIG. 3 is a schematic diagram of a frequency-to-space converter based on an arrayed-waveguide grating suitable for use with the three-dimensional imaging system of FIG. 1.
Figure 4:
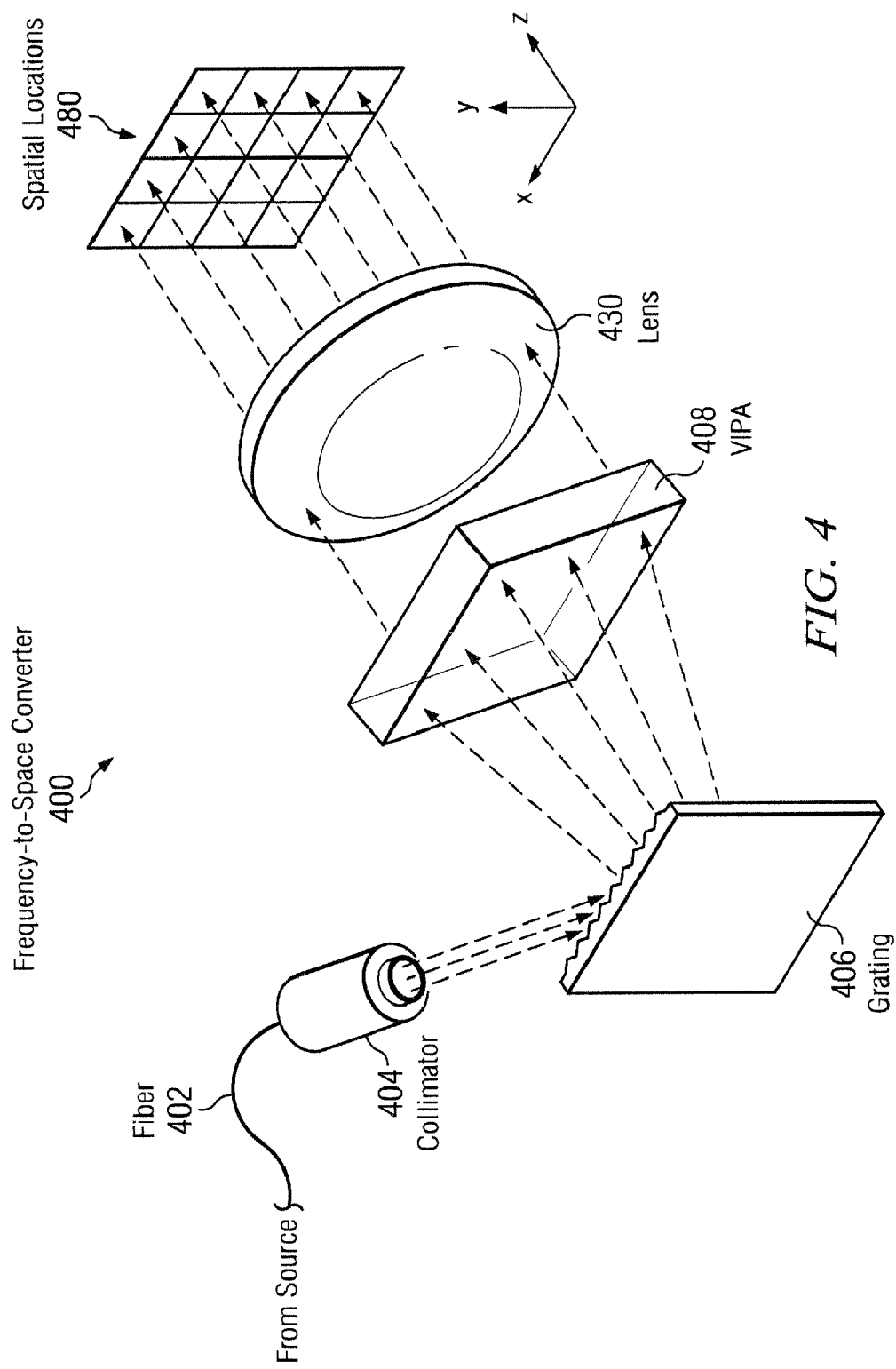
FIG. 4 is a schematic diagram of a frequency-to-space converter based on a grating and a virtual image phased array suitable for use with the three-dimensional imaging system of FIG. 1.

An optical fiber 104 conveys the pulses 101 to a coupler 140, or, alternatively, to a circulator, which is connected to a frequency-to-space converter 120, or dispersive element 120, such as those shown in FIGS. 3 and 4. The frequency-to-space converter 120 projects each pulse 101 to a corresponding spatial location 80 via an aperture 130, which may be defined by a lens and is, in general, an opening through which light, electrons, radio waves, or other radiation can pass. Each pulse 101 is mapped, in a raster scan pattern, to a particular spatial location 80 that is defined by a pair of transverse coordinates (i.e., x and y). For example, pulse 101a is mapped to location 80a at $x_1, y_1$; pulse 101b is mapped to location 80b at $x_2, y_1$; etc. Although the imaging system 100 shown in FIG. 1 is shown resolving just four spatial locations, actual imaging systems may be able to resolve hundreds to thousands of spatial locations.

In the system shown in FIG. 1, each spatial location 80 is defined, in part, by a depth D which is about equal to half the product of the propagation speed of the pulse, c, and the interval between successive pulses, T: $D=cT/2$. (Other systems, including those described below, may use pulses separated by times intervals that are shorter than propagation time associated with the depth of a given spatial location or range bin.) As each pulse 101 propagates through the corresponding spatial location 80, it scatters or reflects off objects and/or particles distributed along the depth of the spatial location 80. The aperture 130 collects some of the scattered and reflected light, and images or directs the collected light back to the frequency-to-space converter 120. The dispersive element 120 recombines the collected light and couples it into a fiber 104 (or other suitable waveguide), which transmits the collected light as a series of returned pulses 102a-102d (collectively, returned pulses 102) to a photon-counting transducer 150 via the coupler 140.

The photon-counting transducer 150, which is part of a photodetector, converts the incident optical pulses 102 into electrical signals (not shown) that can be used to reconstruct a 3D (angle-angle-range) image of the object, as explained in greater detail below. Although the imaging system 100 uses direct detection, other imaging systems may use pre-amplified direct detection or coherent (i.e., heterodyne or homodyne) detection to convert optical pulses 102 into electrical signals.

In general, desirable transducers are sensitive enough to count single photons and have timing jitter low enough to make range measurements with resolution of better than a centimeter. Suitable transducers include, but are not limited to, the transducers in Geiger-mode avalanche photodiodes, photomultiplier tubes, transition edge sensors, and superconducting nanowires.

At the time of this filing, high-performance superconducting nanowire single-photon detectors (SNSPDs) offer the world's best photon-counting performance at wavelengths near 1.55 μm, but they have never been used for imaging applications before. This may be because it is challenging to build an imaging array of SNSPDs with the associated readout electronics. Fortunately, the imaging system 100 shown in FIG. 1 needs only one transducer, eliminating the need to create an array of SNSPDs.

SNSPDs for use at wavelengths of 1.55 μm can be >75% efficient, have minimal (e.g., 30 ps) timing jitter, short (e.g., 1.5 ns) reset times, negligible dark counts, negligible afterpulsing, and negligible crosstalk. Moreover, while the detection efficiency of avalanche photodiodes drops to zero for wavelengths beyond about 1.7 μm, SNSPDs can detect individual photons with wavelengths up to 4 μm. The SNSPD's timing jitter of less than 30 ps, over an order of magnitude better than that of an avalanche photodiode, means that an SNSPD-based imager is capable of sub-centimeter range precision. Averaging may improve the resolution even more. Imaging with ten times better depth resolution allows resolution of minute shapes, including faces.

Range Resolution and Precision

Figure 2A:
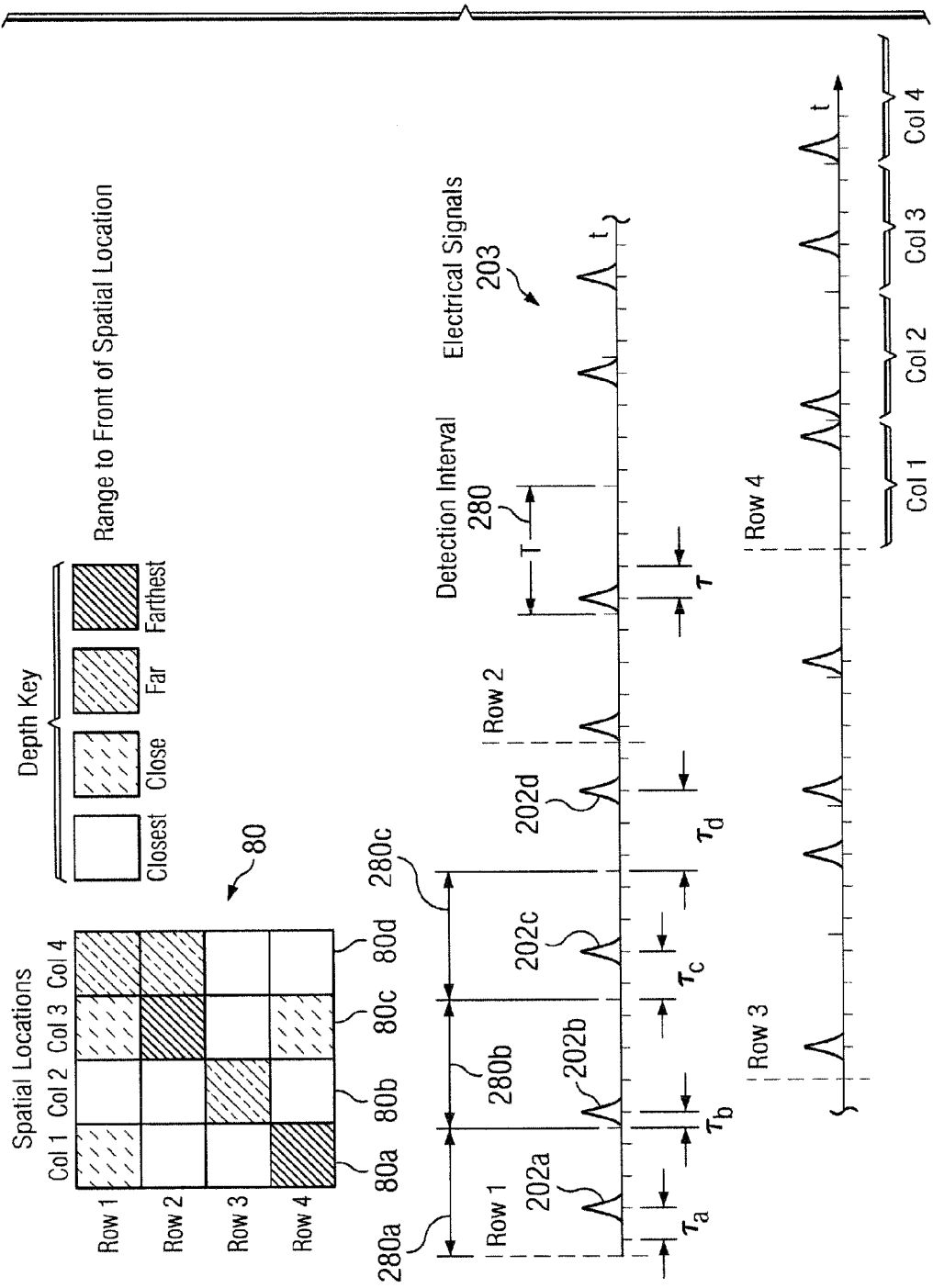
FIG. 2A is a diagram illustrating location-to-signal mapping according to embodiments of the present invention.

Together, FIGS. 1 and 2 illustrate how the imaging system 100 can be used to generate electrical signals 203 (FIG. 2A) that represent a 3D image of the spatial locations 80. Suppose, for example, that each of the sixteen spatial locations 80 shown in FIGS. 1 and 2 includes a single scattering or reflecting center. In this example, the scattering and reflecting centers are distributed at one of four resolvable depth positions. After a transmitted pulse 101 is projected towards its corresponding spatial location 80, the pulse 101 propagates in z until it illuminates the scattering/reflecting center in the spatial location 80. The scattering/reflecting center scatters or reflects a returned pulse towards the aperture 130, which collects the returned pulse 102 for coupling to the transducer 150.

In this example, each returned pulse 102 arrives at the transducer 150 within a window equal to the interval T between transmitted pulses 101. The transducer 150 converts the returned pulses 102 into a corresponding electrical signal 203, shown in FIG. 2A. The arrival of a pulse 102 causes a peak 202a-202d (collectively, peaks 202) to appear in the electrical signal 203 during a detection interval 280, where the duration of the detection interval equals the time, T, between successive emitted pulses 102. Because each returned pulse 102 arrives from a unique spatial location 80 during a unique detection interval, each spatial location 80 is mapped uniquely to an detection interval. For example, the space-to-time mapping shown in FIGS. 1 and 2 is a one-dimensional, raster mapping in time, where successive rows of spatial locations 80 are mapped into successive groups of detection intervals, just like the signals used to drive cathode ray tubes. Other arrangements of space-to-time mapping are also possible, provided that mapping preserves the identification of a given detection interval 280 with a corresponding spatial location 80.

The position at which (i.e., when) the peak 202 appears in the electrical signal 203 depends on the range to the scattering/reflecting center in the corresponding spatial location 80. In the example shown in FIGS. 1 and 2, the delay, $\tau_a$, between the arrival of the first returned pulse, pulse 102a, and the beginning of the pulse arrival window equals the round-trip distance from the forward edge of the spatial location 80a and the depth from which the incident pulse 101a was scattered or reflected. That is, $\tau_a=2d_a/c$, where $d_a$ is the distance between the front of the spatial location 80a and the location of the scattering/reflecting center. Multiple scattering/reflecting centers associated with a given spatial location 80 may produce a more complex series of peaks 202 in the electrical signal 203.

As in other laser imaging systems, the range resolution and precision depend, in part, on the temporal resolution and precision of the transducer 150. Photon-counting transducers 150, such as SNSPDs, provide especially fine time resolution because they can measure the arrival times of individual photons, making it possible to "time-tag" particular detection events. Timing jitter, however, may obscure the true arrival time of the detected photon. Thus, using a transducer 150 with low timing jitter, such as an SNSPD, enables finer measurements. Range resolution also depends on the width of each pulse—in general, shorter pulses 101 yield finer resolution.

(That is, pulse bandwidth determines range resolution.) For example, pulse widths of less than about 60 ps may enable range resolutions of under one centimeter.

Avoiding Range Ambiguity

As the depth of the scattering/reflecting center within the spatial location 80 increases, the delay increases as well. If the delay increases too much, however, the returned pulse 102 (and peak 202) may appear after the detection interval 280 has elapsed. If the returned pulse 102 falls within the wrong detection interval 280, the returned pulse 102 may create a peak in the electrical signal 203 that cannot be correctly matched to a spatial location 80. Suppose, for instance, that the second returned pulse 102*b* is delayed by a time $\tau_b > T$; as a result, it may arrive in the interval 280*c* allotted to the third spatial location 80*c* and be indistinguishable from pulses 102*c* from scattering/reflecting pulses in the third spatial location 80*c*. Similarly, mapping a given center frequency to more than one spatial location 80 may also introduce ambiguity as to the source of a particular return.

Range ambiguity can be avoided altogether by restricting transmission and/or reception of pulses 101 and 102 to specified windows. Range ambiguity can also be resolved by keeping the wavelength order the same and varying the transmitter pulse timing within the pulse interval (e.g., by using the pulse carver). Alternatively, range ambiguity can be avoided by reordering the sequence of pulse center wavelengths on successive imaging frames.

Figure 2B:
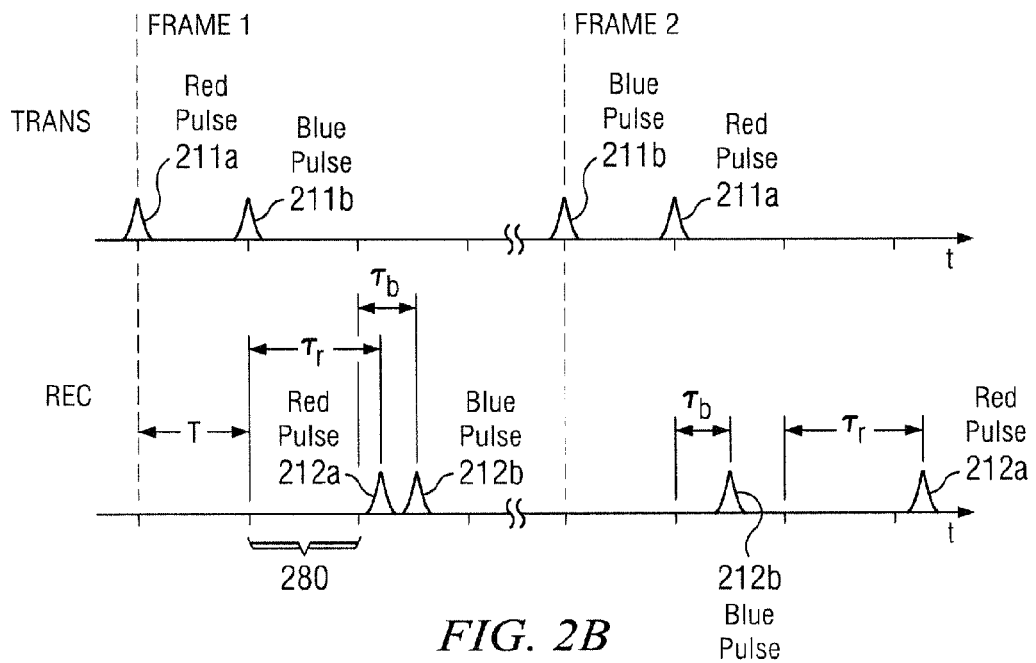
FIG. 2B is a diagram illustrating pulse re-ordering for resolving range ambiguity according to embodiments of the present invention.

FIG. 2B illustrates how changing pulse ordering in successive frames can be used to resolve range ambiguity. In the first frame, a red pulse 211*a* is transmitted before a blue pulse 211*b*; the returned red pulse 212*a* arrives with a delay $\tau_r > T$, and the returned blue pulse 212*b* arrives with a delay $\tau_b < T$. (Here, the labels, "red" and "blue," indicate the center frequencies of the pulses.) In the first frame, the red and blue pulses are detected in the detection interval 280 for the blue pulse. Since the transducer does not provide any information about wavelength, there is an ambiguity about which pulse corresponds to which spatial location. In the second frame, a controller coupled to the source rearranges the order of the pulses so that the blue pulse 211*b* is transmitted before the red pulse 211*a*; as a result, the returned blue pulse 212*b* is detected in the first detection interval 280 and the returned red pulse 211*a* is detected in the third detection interval 280. If the target has not moved or shifted dramatically between frames, the change in the arrival times of the returned pulses from the first frame to the second frame can used to resolve the range ambiguity caused by the excessive delay, $\tau_r > T$.

Transverse Resolution

While timing jitter may limit range resolution, diffraction may limit transverse resolution (i.e., spatial angle-angle) resolution. In general, the angle-angle resolution is specified in terms of the smallest spot that can be resolved at a given range to the target, where the range is the mean distance to the target (spatial location). For a mean pulse wavelength of λ, an aperture diameter $d_T$, and an average range to the target (e.g., spatial locations 80) of L, the minimum spot size $d_{min} = 4\lambda L/\pi d_T$ for vacuum propagation. For an aperture 130 with a diameter of 30 cm, a properly aligned imaging system 100 should have an angle-angle resolution of about 5 mm at a range of L=1 km; an aperture 130 with a diameter of 3 cm allows the same transverse resolution at a range of L=100 m. Using a modest pulse energy, e.g., on the order of 10 μJ, allows imaging at ranges on the order of 1 km. Shorter-range applications may require much lower pulse energies.

The imaging system's angular resolution can selected by adjusting the divergence of the laser illuminator and the field-of-regard of the aperture 130. Background noise can be minimized through a combination of narrow-band spectral and temporal filtering, e.g., by heterodyne detection. Multi-frame acquisition and processing can further be used to improve the SNR ratio and, since SNSPDs have about 1.5 ns recovery times, compared to recovery times of 3 μs for APDs, multi-frame integration can be employed with negligible speed penalty. In multi-frame integration, multiple frames of the target are acquired. These frames can be average to reduce noise, address low signal flux, and resolve range ambiguity, as described above. Frames acquired from different positions or angles can also be used to improve the resolution of the reconstructed image.

Similarly, the number of resolvable spatial locations 80 depends in part on the diameters of the apertures used to transmit and receive the pulses 101, 102. In general, the number of spatial locations, $D_f$, that an imaging system can resolve is:

$$D_f = (d_R/d_{min})^2 = (\pi d_T d_R/4\lambda L)^2,$$

where $d_R$ is the diameter of the receiving aperture. For monostatic imaging systems, including the system 100 shown in FIG. 1, a common aperture (e.g., aperture 130) transmits and receives emitted and returned pulses 101, 102. Bistatic systems, however, include both a transmission aperture and a receiving aperture. In the systems described herein, however, the number of uniquely identifiable frequencies may also limit the number of resolvable spatial locations 80, as each spatial location 80 is mapped to a pulse 101 with a particular center frequency.

Frequency-to-Space Converters

FIG. 3 shows an arrayed waveguide grating (AWG) 300 suitable for use as the frequency-to-space converter 120 shown in FIG. 1. Light enters the AWG 300 via an input coupler 302, then transits a first multimode propagation region 304 to an array of single-mode waveguides 306, which are arranged top-to-bottom in order of decreasing length. Light propagates from the waveguides 306 to a second multimode propagation region 308, then exits the AWG 300 via output couplers 310.

The AWG 300 uses propagation-induced phase shifts and interference to map the frequency components of a broadband input, such as an emitted or returned pulse 101, 102, to corresponding output couplers 310. The first multimode propagation region 304 distributes an input pulse to each of the waveguides 306 such that each frequency component of the input pulse propagates through all the waveguides 306. As the different frequency components travel through the waveguides 306, they accumulate phase shifts that depend on their wavelengths and the lengths of the waveguides 306. Upon exiting the waveguides 306, the frequency components interfere in the second multimode propagation region 308 to produce a series of peaks aligned to the output couplers 310, where each peak corresponds to a particular frequency component. In other words, interference separates the frequency components into different channels, each of which is mapped to a particular output coupler 310. Arranging the output couplers 310 in a one- or two-dimensional (1D or 2D) grid maps the different channels to different spatial locations.

FIG. 4 shows an alternative frequency-to-space converter 400 constructed from a 1D grating 406 and a virtual image phased array (VIPA) 408. (Some lenses and coupling optics have been omitted for clarity.) The frequency-to-space converter 400 can also be used to map pulses 101 to spatial locations 80 in the imaging system 100 shown in FIG. 1. A fiber 402 couples broadband light, such as emitted or returned pulses 101, 102, to a collimator 404 that illuminates the 1D grating 406. The grating 406 diffracts different frequency components of the broadband light along the x axis, where each angle along the line corresponds to a coarse frequency bin. (In other words, the grating introduces a large linear phase shift in the beam along the x axis.) The diffracted light illuminates the top of the VIPA 408, which is an etalon tilted about the x axis. Beams coupled into the VIPA 408 reflect off the inner walls of the VIPA 408, propagating along a zig-zag path from the top to the bottom of the VIPA 408, which causes the beams to accumulate small linear phase shifts along the y axis.

A portion of the light is coupled out of the VIPA's far wall, which is coated with a partially reflecting coating, to create a 2D array of beams arranged in a raster pattern in order of phase: coarse phase from left to right, fine phase from top to bottom. Fourier-transforming the output of the VIPA with a lens 430 yields another 2D array of beams mapped onto respective spatial locations 480 and arranged in a raster pattern in order of frequency: fine frequency from left to right, coarse frequency from top to bottom. When the converter 400 is illuminated with a series of pulses at increasing center frequencies, such as pulses 102, the converter's output is a single spot that scans through the spatial locations 480 along a 2D raster pattern.

Bistatic Imaging Systems

Figure 5:
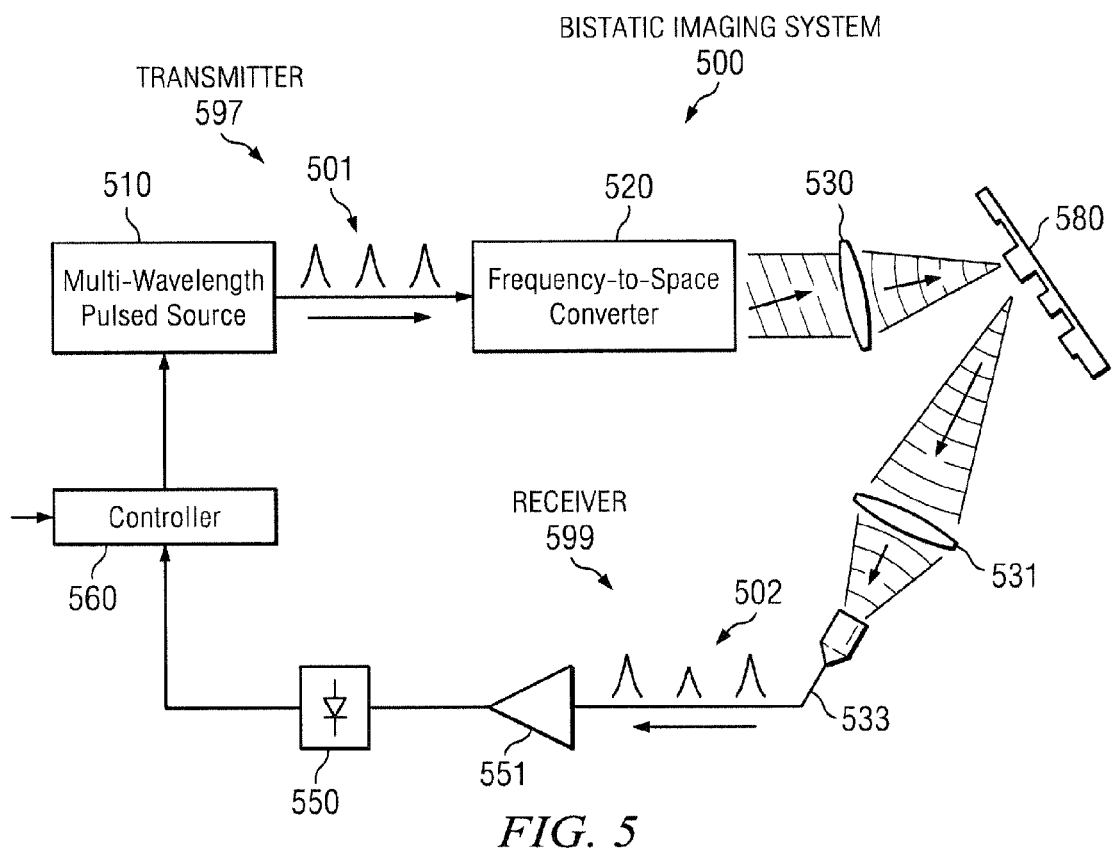
FIG. 5 is a schematic diagram of a bistatic imaging system according to embodiments of the present invention.

FIG. 5 shows a bistatic imaging system 500 that operates according to principles of the present invention. The bistatic imaging system 500 includes a transmitter 597, which generates and projects a series of pulses 501 onto spatial locations 580, and a receiver 599, which collects radiation scattered or reflected from the spatial locations 580. A pulsed, multi-wavelength source 510 in the transmitter 597 generates a series of pulses 501 with different center frequencies. A frequency-to-space converter 520 maps the pulses 501 to corresponding spatial locations 580 via a first lens 530. Although the bistatic imaging system 500 is shown as 2D system, it can be used to capture 3D images by rearranging the frequency-to-space converter 520.

Objects at the spatial locations 580 scatter or reflect the incident pulses 501 with a delay dependent on the depth of the object at the location 580. The receiver 599 collects pulses 502 of the scattered and reflected light falling within an aperture defined by a second lens 531, which couples the collected pulses 502 into a single-mode optical fiber 533, possibly via an optional space-to-frequency converter (not shown), such as the converters shown in FIGS. 3 and 4. The optical fiber 550 delivers the collected pulses 502 to an amplifier 551, such as an erbium-doped fiber amplifier fabricated in a single-mode fiber, that boosts the strength of the collected pulses 502. A transducer 550 that converts the amplified collected pulses 502 into electrical signals indicative of the spatial locations 580. Alternatively, the collected pulses 502 can be delivered to the transducer 550 via free-space optics that filter the collected light down to a single spatial mode; the pulses 502 can also be collected via a second frequency-to-space converter (not shown) coupled to the second lens 531.

The bistatic imaging system 500 also includes a controller 560 coupled to the transducer 550 and the source 510. The controller 560 can vary the pulse repetition frequency (PRF), frequency scan rate, and other parameters of the emitted pulses 501 by changing the settings of the source 510. In some situations, the controller 560 may adjust the PRF and/or frequency scan rate based on the output of the transducer 550. The controller 560 may also respond to external input, including input from an operator or other processor.

While this invention has been particularly shown and described with references to example embodiments thereof, it will be understood by those skilled in the art that various changes in form and details may be made therein without departing from the scope of the invention encompassed by the appended claims. For example, imaging systems and methods according to principles of the present invention can be used to capture 2D images as well as 3D images. Similarly, mode-locked lasers and other pulsed sources may be used to generate the series of pulses projected to the target volume. Likewise, both photon-counting and conventional optical transducers may be used with optical amplifiers, such as erbium-doped fiber amplifiers and solid-state amplifiers, to detect the collected pulses. In addition, different optical components and combinations of optical components can be used to generate, map, project, collect, and detect the pulses used for sensing the spatial locations.

What is claimed is:

1. A three-dimensional imaging system, comprising:
   a source configured to emit a series of pulses, each pulse being at a different center frequency;
   a frequency-to-space converter operably coupled to the source and configured to map each pulse to a different spatial location, each spatial location corresponding to a respective center frequency;
   an aperture configured to receive pulses scattered or reflected from the spatial locations; and
   a transducer operably coupled to the aperture and configured to convert scattered and reflected pulses collected by the aperture into electrical signals representing a three-dimensional image corresponding to the spatial locations.

2. An imaging system as in claim 1, wherein the source includes a tunable laser and a pulse carver.

3. An imaging system as in claim 1, wherein the source includes a mode-locked laser operably coupled to a temporally dispersive element and a filter.

4. An imaging system as in claim 1, wherein successive pulses in the series of pulses are separated by a time equal to or greater than a delay corresponding to a distance between minimum and maximum depths of the three-dimensional image.

5. An imaging system as in claim 1, wherein the center frequencies are at optical frequencies.

6. An imaging system as in claim 1, wherein the frequency-to-space converter includes at least one of: an arrayed waveguide grating; a grating; a prism; and a virtual-image phased array.

7. An imaging system as in claim 1, wherein the frequency-to-space converter is operably coupled to the aperture, the aperture is further configured to project the pulses to the respective spatial locations, and the frequency-to-space converter is further configured to couple scattered and reflected pulses received by the aperture to the transducer.

8. An imaging system as in claim 1, further including:
   another aperture operably coupled to the frequency-to-space converter configured to project the pulses to the respective spatial locations.

9. An imaging system as in claim 1, wherein the aperture is configured to couple-pulses scattered or reflected from each of the spatial locations to the transducer and from every angle received via the aperture.

10. An imaging system as in claim 1, wherein the transducer is a photon-counting transducer.

11. An imaging system as in claim 1, wherein the transducer is the only transducer in the imaging system.

12. An imaging system as in claim 1, wherein the transducer is part of or includes any of: a Geiger-mode avalanche photodiode; a photomultiplier tube; a superconducting nanowire; and a transition edge sensor.

13. An imaging system as in claim 1, wherein the transducer performs at least one of direct detection, pre-amplified direct detection, and coherent detection.

14. An imaging system as in claim 1, wherein the electrical signals represent a temporal map of the three-dimensional image.

15. An imaging system as in claim 1, further including:
a controller operably coupled to the source and configured to change an order of pulses in the series of pulses based on the center frequencies of the pulses.

16. A method of three-dimensional imaging, comprising:
generating a series of pulses, each pulse having at a different center frequency;
projecting each pulse to a different spatial location, each spatial location corresponding to a respective center frequency;
receiving pulses scattered or reflected from the spatial locations; and
converting scattered and reflected pulses into electrical signals representing a three-dimensional image corresponding to the spatial locations.

17. A method as in claim 16, wherein generating the series of pulses includes generating pulses whose center frequencies are at optical frequencies.

18. A method as in claim 16, wherein generating the series of pulses includes changing the order of the pulses based on the center frequencies of the pulses.

19. A method as in claim 18, wherein projecting each pulse to a different spatial location includes projecting each pulse at a different moment in time, at least one pair of successive moments in time being separated by an interval shorter than a delay corresponding to a distance between minimum and maximum depths of the three-dimensional image.

20. A method as in claim 16, wherein projecting each pulse to a different spatial location includes projecting each pulse at a different moment in time, successive moments in time being separated by an interval equal or greater to a delay corresponding to a distance between minimum and maximum depths of the three-dimensional image.

21. A method as in claim 16, wherein projecting each pulse to a different spatial location includes mapping each pulse to a corresponding spatial location based on the center frequency of the pulse.

22. A method as in claim 16, wherein projecting each pulse and receiving pulses occur via a common aperture.

23. A method as in claim 16, wherein projecting each pulse and receiving pulses occur via different apertures.

24. A method as in claim 16, wherein receiving pulses includes coupling pulses scattered or reflected from each of the spatial locations to a transducer and from each angle via which pulses are received.

25. A method as in claim 16, wherein converting scattered and reflected pulses includes detecting pulses with a photon-counting transducer.

26. A method as in claim 16, wherein converting scattered and reflected pulses includes detecting pulses with only one transducer.

27. A method as in claim 16, wherein converting scattered and reflected pulses includes detecting scattered and reflected pulses with at least one of: a Geiger-mode avalanche photodiode; a photomultiplier tube; a superconducting nanowire; and a transition edge sensor.

28. A method as in claim 16, wherein converting scattered and reflected pulses includes performing at least one of direct detection, pre-amplified direct detection, and coherent detection.

29. A method as in claim 16, wherein converting scattered and reflected pulses includes generating a temporal map that represents the three-dimensional image.

30. An imaging system, comprising:
means for generating a series of pulses, each pulse having at a different center frequency;
means for projecting each pulse to a different spatial location, each spatial location corresponding to a respective center frequency;
means for receiving pulses scattered or reflected from the different spatial locations; and
means for converting scattered and reflected pulses into electrical signals representing an image corresponding to the different spatial locations.

* * * * *

UNITED STATES PATENT AND TRADEMARK OFFICE
CERTIFICATE OF CORRECTION

PATENT NO. : 8,159,680 B2  
APPLICATION NO. : 12/706532  
DATED : April 17, 2012  
INVENTOR(S) : Bryan S. Robinson Page 1 of 1

It is certified that error appears in the above-identified patent and that said Letters Patent is hereby corrected as shown below:

Please delete the paragraph titled 'GOVERNMENT SUPPORT' encompassing column 1, lines 7-9:

"The invention was supported, in whole or in part, by a grant FA8721-05-C-0002 from the U.S. Air Force. The Government has certain rights in the invention."

and replace with:

--This invention was made with government support under Contract No. FA8721-05-C-0002 awarded by the U.S. Air Force. The government has certain rights in the invention.--

Signed and Sealed this
Twentieth Day of November, 2012

David J. Kappos
*Director of the United States Patent and Trademark Office*